(12) United States Patent
Sterin et al.

(10) Patent No.: US 10,871,925 B2
(45) Date of Patent: *Dec. 22, 2020

(54) PROVISIONING DATA VOLUMES FOR CONTAINERS RUNNING IN VIRTUAL MACHINES

(71) Applicant: VMware, Inc., Palo Alto, CA (US)

(72) Inventors: Mark Sterin, Mountain View, CA (US); Govindan Thirumal Thiruvengada, Bangalore (IN); Ritesh H. Shukla, Saratoga, CA (US); Andrew Stone, Somerville, MA (US); Prashant Dhamdhere, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 37 days.

This patent is subject to a terminal disclaimer.

(21) Appl. No.: 15/608,865

(22) Filed: May 30, 2017

(65) Prior Publication Data

US 2017/0344292 A1 Nov. 30, 2017

Related U.S. Application Data

(60) Provisional application No. 62/343,780, filed on May 31, 2016.

(51) Int. Cl.
*G06F 3/06* (2006.01)
*G06F 9/455* (2018.01)

(52) U.S. Cl.
CPC .......... *G06F 3/0665* (2013.01); *G06F 3/0605* (2013.01); *G06F 3/067* (2013.01); *G06F 3/0608* (2013.01); *G06F 3/0619* (2013.01); *G06F 3/0631* (2013.01); *G06F 3/0632* (2013.01); *G06F 3/0653* (2013.01); *G06F 3/0689* (2013.01); *G06F 9/45558* (2013.01); *G06F 2009/45562* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| 5,193,171 | A | 3/1993 | Shinmura et al. | |
| 9,852,011 | B1* | 12/2017 | Yemini | G06F 9/5083 |
| 2005/0257003 | A1 | 11/2005 | Miyazaki et al. | |
| 2009/0024752 | A1* | 1/2009 | Shitomi | G06F 3/0605 709/230 |
| 2009/0240910 | A1* | 9/2009 | Inomata | G06F 3/0605 711/171 |
| 2009/0288084 | A1 | 11/2009 | Astete et al. | |
| 2013/0036266 | A1* | 2/2013 | Naganunna | G06F 3/061 711/114 |

(Continued)

*Primary Examiner* — Charles J Choi
(74) *Attorney, Agent, or Firm* — Patterson + Sheridan, LLP (57) ABSTRACT

A computer system has a virtualization software that supports execution of a virtual machine in which a container is run. A method of provisioning a data volume for the container in this computer system includes the steps of monitoring a designated virtual socket, detecting, based on the monitoring, a request from a plug-in of the container to create a data volume, and upon detecting the request, communicating the request to the virtualization software to cause the virtualization software to create the data volume.

20 Claims, 4 Drawing Sheets

(56) References Cited

U.S. PATENT DOCUMENTS

| | | | |
|---|---|---|---|
| 2013/0086585 A1* | 4/2013 | Huang | H04L 67/14 |
| | | | 718/1 |
| 2013/0125119 A1* | 5/2013 | Vipat | G06F 9/45533 |
| | | | 718/1 |
| 2013/0179648 A1 | 7/2013 | Yagame et al. | |
| 2015/0378624 A1* | 12/2015 | Choudhary | G06F 3/0619 |
| | | | 711/114 |

* cited by examiner

PROVISIONING DATA VOLUMES FOR CONTAINERS RUNNING IN VIRTUAL MACHINES

CROSS-REFERENCE TO RELATED APPLICATION(S)

This application claims the benefit of priority from U.S. Provisional Patent Application No. 62/343,780, filed May 31, 2016, which is incorporated by reference herein.

BACKGROUND

Increasingly, decisions to provision resources and manage resources are made by application logic, e.g., containers, running within virtual machines (VMs), and they typically require a self-serve-programmatic model for provisioning and management. Some frameworks can choose to create an instance of a container image and attach persistent storage (e.g., data volumes) to the container image, all within the VM.

However, there exist challenges when trying to meet the need for a self-serve-programmatic model. Some existing management stacks require manual steps, including opening up a user interface (UI) and directing the provisioning of data volumes through the UI. Other existing management stacks require invoking of a remote application programming interface (API) to a control plane for provisioning data volumes. This latter technique typically also requires per VM configuration.

SUMMARY

One or more embodiments provide a control plane for data volume management that can be invoked within a container that is spun up within a VM. One example of a data volume is a virtual disk. More generally, a "data volume" is a place where the container can store data persistently. The control plane is configured as a daemon or other service that is running in the user space of a hypervisor that is supporting the execution of the VM and listens in on a virtual socket provisioned within the VM.

Advantages of employing the control plane within the hypervisor, according to embodiments, are as follows. First, it does not require human intervention to carry out the data volume provisioning requested by the application administrator. Second, the control plane is local to the VM and does not require any additional configuration beyond the installation of the data volume plug-in software in the VM.

In one embodiment, to protect against untrusted plug-ins from sending control operations to a control plane within the hypervisor, the control plane requires control operations passed thereto to originate from software running in the root mode. As a result, only those plug-ins that are trusted software (e.g., signed with proper cryptographic keys) will be able to send control operations successfully to the control plane. For example, control operations sent to the control plane via third party plug-ins, which would be running in non-root mode, will be not be accepted by the control plane.

A method of provisioning a data volume for a container, according to one embodiment, includes the steps of monitoring a designated virtual socket, detecting, based on the monitoring, a request from a plug-in of the container to create a data volume, and upon detecting the request, communicating the request to a virtualization software that supports the execution of a virtual machine in which the container is running, to cause the virtualization software to create the data volume.

Further embodiments include, without limitation, a non-transitory computer-readable medium that includes instructions that enable a processor to implement one or more aspects of the above method as well as a computer system having a processor, memory, and other components that are configured to implement one or more aspects of the above method.

DETAILED DESCRIPTION

Figure 1:
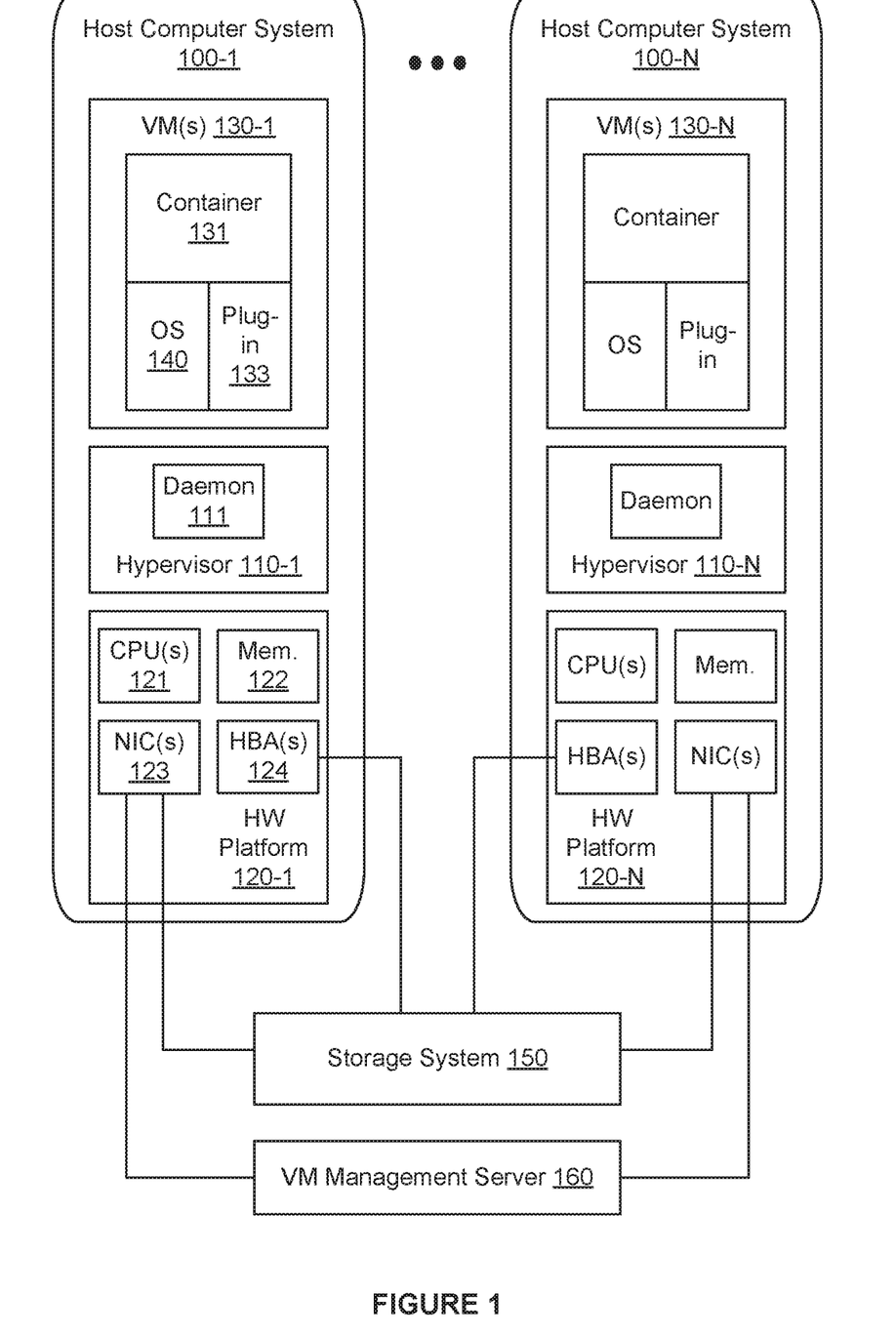
FIG. 1 is a block diagram of a virtualized computing environment in which embodiment may be practiced.

FIG. 1 is a block diagram of a virtualized computing environment in which embodiments may be practiced. The virtualized computing environment of FIG. 1 includes a cluster of host computer systems 100-1 to 100-N, where N is 2 or more. Alternatively, embodiments may be practiced in a virtualized computing environment that includes only a single host computer system. Host computer system 100-1 has a hardware platform 120-1 that includes one or more central processing units (CPUs) 121, system memory 122 (typically volatile dynamic random access memory), one or more network interface controllers (NICs) 123, and one or more host bus adapters (HBAs) 124. Each of the other host computer systems 100, including host computer system 100-N which has a hardware platform 120-N, includes the same (or similar) hardware components as hardware platform 120-1. In addition, a hypervisor is installed in each of host computer systems 100 as system software. Hypervisor 110-1 supports the execution space of virtual machines (VMs) 130-1 and hypervisor 110-N supports the execution space of VMs 130-N. Hereinafter, VMs will be generally referred to as VM 130 or VMs 130 and the hypervisor supporting the VMs 130 will be generally referred to as hypervisor 110.

As further illustrated in FIG. 1, a container 131 runs inside VM 130-1 on top of an operating system (OS) 140 of VM 130-1. One example of container 131 is a Docker® container that runs on top of a Linux® operating system. Typically, container 131 includes a management layer (known as a container engine) on top of OS 140 and one or more applications deployed therein to run on top of the management layer.

In FIG. 1, a plug-in 133 is also illustrated. Plug-in 133, which is implemented as part of the plug-in framework of the container (e.g., as part of Docker® plug-in framework for Docker® containers), is configured to communicate with hypervisor 110-1 over a virtual socket provisioned by hypervisor 110-1 as part of a virtual hardware platform for VM 130-1. The virtual socket is also referred to as a back channel, and enables VM 130-1 to communicate with hypervisor 110-1. In one embodiment, the virtual socket is implemented as shared memory, such as with virtual machine control interface (VMCI) employed in virtualization products available from VMware, Inc. of Palo Alto, Calif., and is accessed through VMCI ports. More specifically, daemon 111 runs in a user space of hypervisor 110-1 to listen in on this virtual socket and, in the embodiments, passes on control operations received through this virtual socket to hypervisor 110-1 for execution using standard APIs. Examples of these standard APIs include creating a data volume, deleting a data volume, attaching a data volume, and detaching a data volume. Accordingly, operations to create, delete, attach, or detach a data volume can be instigated within container 131 and such control operations are "plumbed" to plug-in 133 that forwards those control operations over the virtual socket to daemon 111, which calls the standard APIs to perform control operations on the data volume.

A virtual machine management server (VMMS) 160 manages VMs across host computers systems 100. The execution of the VMs is supported by the hypervisors of the respective host computer systems 100. The standard APIs exposed by hypervisor 110 for creating, deleting, attaching, and detaching a data volume are made accessible through a storage user interface (UI) of VMMS 160 so that control operations for data volumes of VMs (e.g., virtual disks) can be instigated by a VM administrator.

The data volumes for the container or the VMs are stored in storage system 150. In the embodiment illustrated in FIG. 1, storage system 150 is a shared storage system, which is accessible from host computer systems 100 through their HBAs 124. In another embodiment, storage system 150 may be network-attached storage (NAS) or virtual storage area network (SAN), which is accessible from host computer systems 100 over a network through their NICs 123.

Figure 2A:
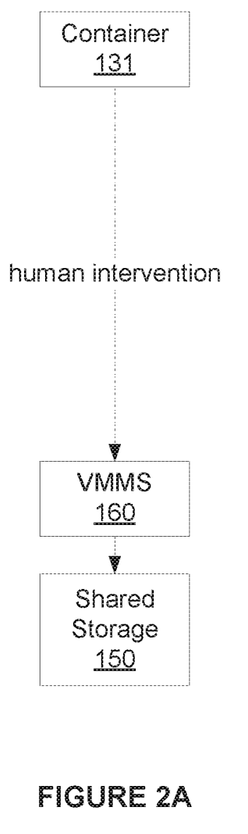
FIG. 2A is a conceptual flow diagram of data volume provisioning according to the related art.
Figure 2B:
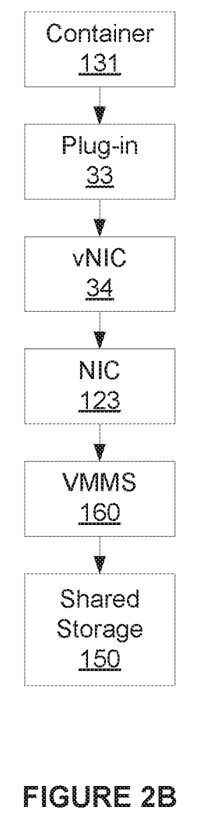
FIG. 2B is a conceptual flow diagram of data volume provisioning according to the related art.

FIGS. 2A and 2B are conceptual flow diagrams of a method for data volume provisioning of the related art. In the method of FIG. 2A, when an application administrator for container 131 requests data volume control operations, e.g., data volume create, delete, attach, or detach, the request is manually communicated (e.g., via e-mail or phone call) to the VM administrator who accesses a control plane for data volume provisioning implemented in VMMS 160 through the storage UI. The VM administrator initiates control operations according to the request through the storage UI. The method of FIG. 2B is automated but requires a plug-in 33 that can access the control plane of VMMS 160. Therefore, plug-in 33 is required to store the credentials for accessing the control plane of VMMS 160. Upon accessing the control plane of VMMS 160, control operations are sent to the control plane of VMMS 160 to be carried out by VMMS 160 using the standard APIs for provisioning data volumes. A big disadvantage of the method of FIG. 2B is the need for storing credentials for accessing VMMS 160 locally in host computer 100-1. In addition, in order for VM 130-1 to recognize the data volume that is provisioned by VMMS 160, the configuration file for VM 130-1 has to be updated.

Figure 2C:
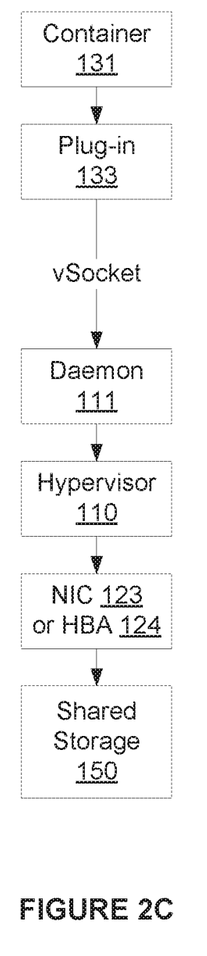
FIG. 2C is a conceptual flow diagram of data volume provisioning according to embodiments.

According to embodiments, the data volume control plane is implemented in hypervisor 110 through daemon 111 which is listening in on the virtual socket through which plug-in 133 forwards data volume control operations. As data volume control operations are passed down from container 131 to plug-in 133 and forwarded onto the virtual socket, daemon 111, upon detection of the data volume control operation, invokes the standard APIs exposed by hypervisor 110 for provisioning data volumes. As a way to protect against untrusted applications or plug-ins from gaining access to the data volume control plane, any application or plug-in not running in root mode are blocked from gaining access to the data volume control plane. This is implemented by daemon 111 listening in on a privileged virtual socket, i.e., the virtual socket that is accessed through a privileged VMCI port. As such, any control operations forwarded onto a non-privileged virtual socket will be ignored by daemon 111. Accordingly, in the embodiments, plug-in 133 is implemented as a secure module that runs in root mode. In order to preserve its image and to protect it against tampering, the executable code of this secure module is signed with cryptographic keys of a trusted entity.

Figure 3:
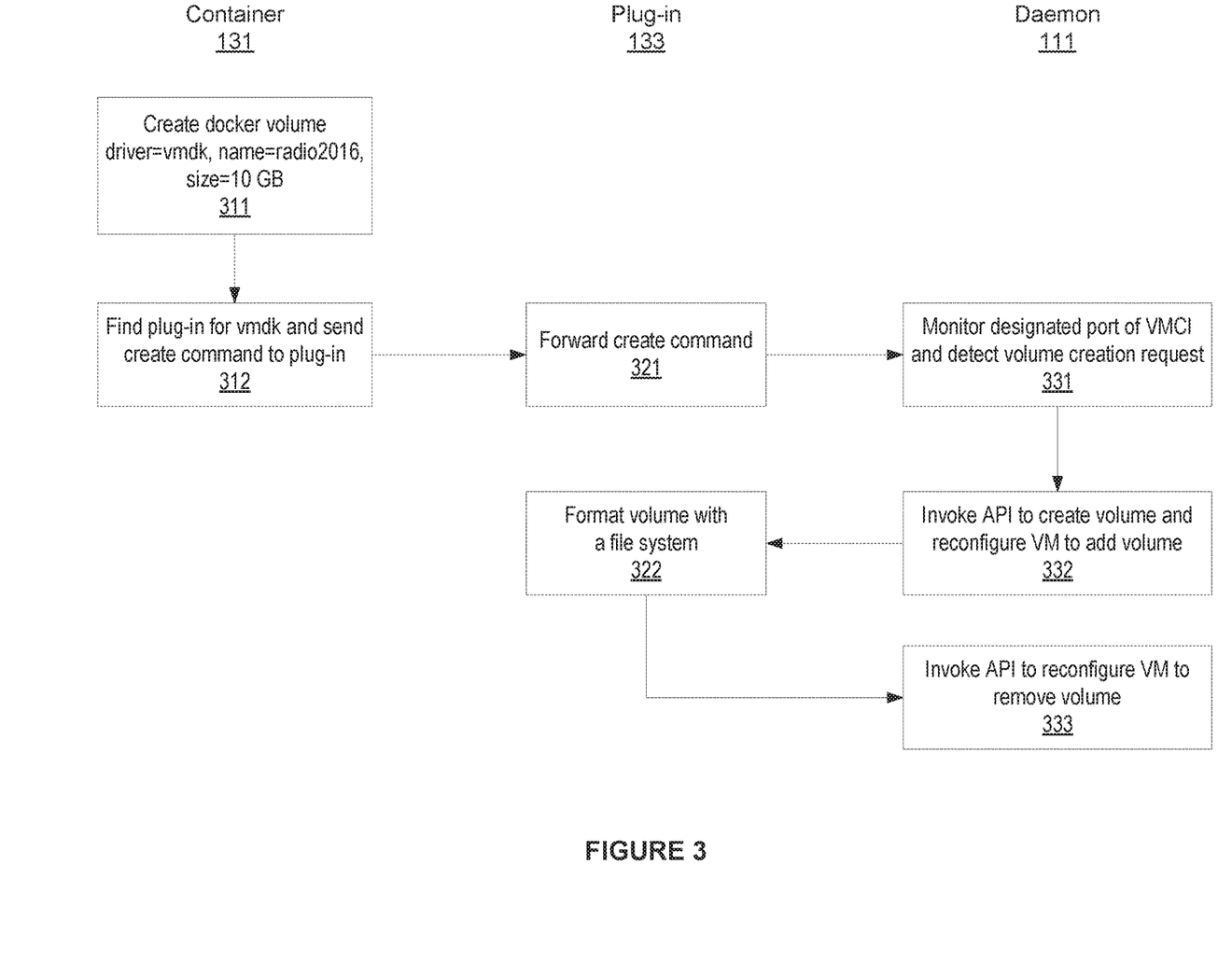
FIG. 3 is a flow diagram of a method of creating a data volume according to embodiments.

FIG. 3 is a flow diagram of a method of creating a data volume according to embodiments. The method illustrated in FIG. 3 is carried out by container 131, plug-in 133, and daemon 111. When the application administrator desires to create a data volume for container 131, the application administrator enters command line instructions for creating the data volume at step 311, e.g., "create docker volume, driver=vmdk, name=radio2016, size=10 GB." In response to the command line instruction entered at step 311, container 131 searches for a plug-in of the driver indicated in the command, in this example, vmdk, and sends the create data volume command to the plug-in (step 312).

At step 321, the plug-in, e.g., plug-in 133, upon receipt of the create data volume command from container 131, forwards the create data volume command to daemon 111 through a virtual socket. In particular, plug-in 133 invokes a virtual socket API to forward the create data volume command to the virtual socket through a privileged VMCI port (e.g., a VMCI port that has been pre-designated as a privileged port).

Daemon 111 runs as a background process in the user space of hypervisor 110, and listens in on (monitors) the privileged virtual socket for new requests at step 331. Upon detecting a create data volume request, daemon 111 at step 332 invokes the standard APIs for (1) creating a data volume for the virtual machine that is hosting container 131, and (2) reconfiguring the virtual machine to add the data volume (i.e., updating the virtual machine configuration file to include an identifier for the newly provisioned data volume). In response to the APIs invoked at step 332, hypervisor 110 provisions a new data volume, and the newly provisioned data volume becomes attached to the virtual machine (i.e., the newly provisioned data volume is enumerated as one of the devices of the virtual machine). In addition, daemon 111 maintains a metadata file in memory 122 and persisted in storage system 150, to track the association of new data volumes and the virtual machines for which the new data volumes have been created.

At step 322, plug-in 133 formats the data volume with a file system. A file system specified by the application administrator in the command line instructions may be used in formatting the data volume. If no such file system is specified, a default file system is used.

After the data volume has been formatted with the file system at step 322, the control returns to daemon 111, at which time daemon invokes the standard API for reconfiguring the virtual machine to detach the data volume (i.e., updating the virtual machine configuration file to remove the identifier for the newly provisioned data volume). In response to the API invoked at step 333, the newly provisioned data volume becomes detached from the virtual machine (i.e., the newly provisioned data volume is no longer enumerated as one of the devices of the virtual machine).

Figure 4:
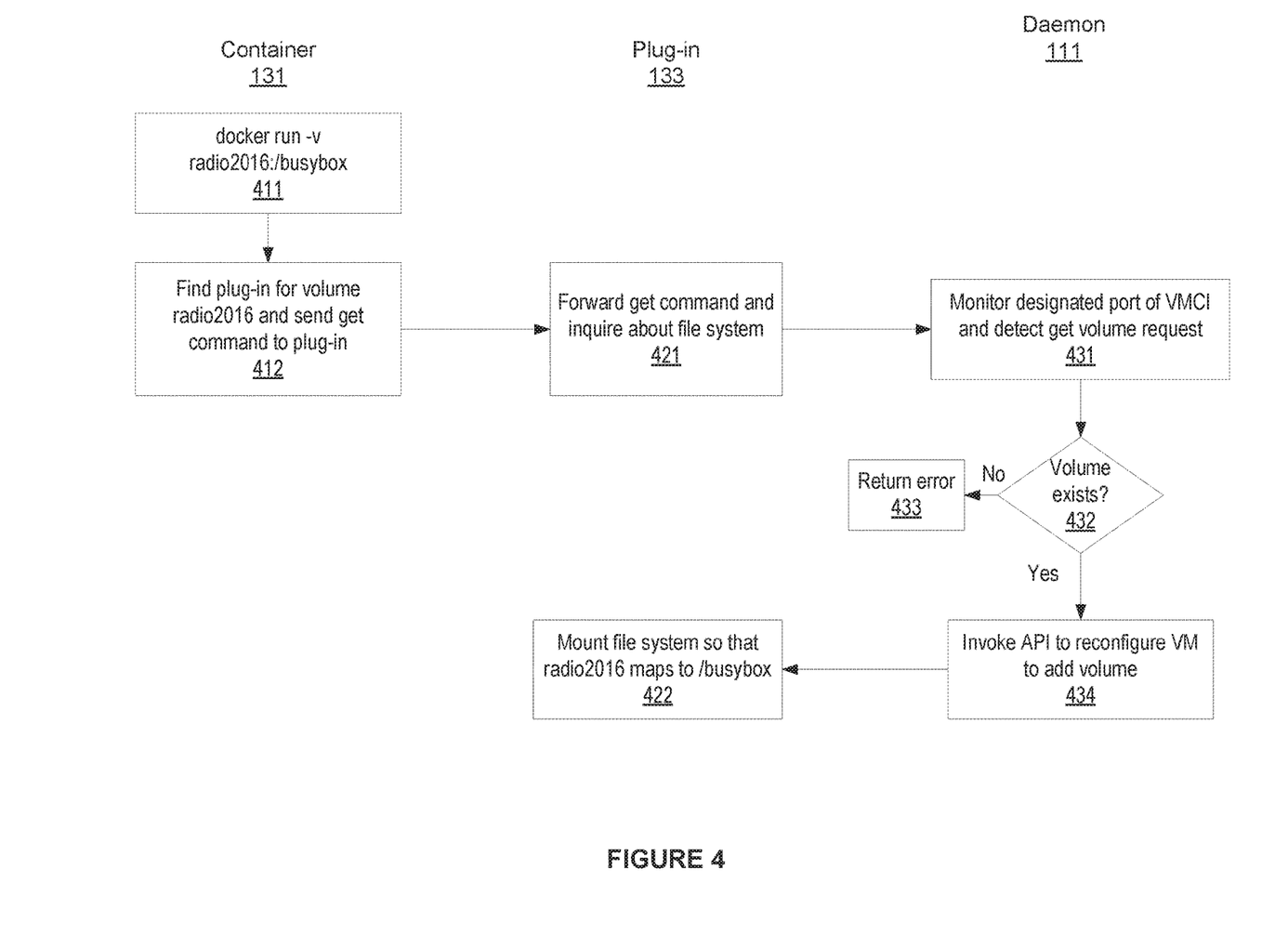
FIG. 4 is a flow diagram of a method of mapping a data volume to a namespace according to embodiments.

FIG. 4 is a flow diagram of a method of mapping a data volume to a namespace according to embodiments. The method illustrated in FIG. 4 is carried out by container 131, plug-in 133, and daemon 111, and in response to a container run command. When the application administrator desires to map a data volume to a namespace for container 131, the application administrator enters command line instructions to run the container at step 411, e.g., "docker run, radio2016:/busybox." When this particular command line instruction is executed within container 131, container 131 is spun up using data volume, radio2016, mapped to the namespace /busybox. Also, in response to the command line instruction entered at step 411, container 131 locates the plug-in corresponding to the data volume indicated in the command, in this example, radio2016, and sends a get data volume command to the plug-in (step 412).

At step 421, the plug-in, e.g., plug-in 133, upon receipt of the get data volume command from container 131, forwards the get data volume command to daemon 111 through a virtual socket. In particular, plug-in 133 invokes a virtual socket API to forward the get data volume command to the virtual socket through the privileged VMCI port.

Daemon 111 listens in on (monitors) the privileged virtual socket for new requests at step 431. Upon detecting a get data volume request, daemon 111 at step 432 checks the metadata file to see if the data volume exists. If no such data volume exists, daemon 111 returns an error at step 433. If the data volume exists, daemon 111 invokes the standard APIs for reconfiguring the virtual machine to add the data volume (i.e., updating the virtual machine configuration file to include an identifier for the data volume). In response to the APIs invoked at step 434, the data volume becomes attached to the virtual machine (i.e., the data volume is enumerated as one of the devices of the virtual machine).

In response to the virtual socket API invoked at step 421, plug-in 133 at step 422 receives a device ID corresponding to the data volume from daemon 111, maps the device ID to the data volume, and mounts the file system of the data volume into the namespace used by container 131 so that the data volume can be mapped to a folder accessible by container 131, e.g., so that the volume, radio2016, can be mapped to the /busybox folder.

In the example given above, a container that instigated the creation of a data volume may be the same or different from a container that is run using that data volume. In addition, a container that instigated the creation of a data volume may be running in a first virtual machine and a container that is run using that data volume may be running in a second virtual machine. The first and second virtual machines may be executed in the same or different host computer systems so long as the host computer systems are accessing the same storage system in which the data volume is provisioned.

Certain embodiments as described above involve a hardware abstraction layer on top of a host computer. The hardware abstraction layer allows multiple contexts or emulated computing instances to share the hardware resource. In one embodiment, these emulated computing instances are isolated from each other, each having at least a user application running therein. The hardware abstraction layer thus provides benefits of resource isolation and allocation among the emulated computing instances. In the foregoing embodiments, emulated machines are used as an example for the emulated computing instances and hypervisors as an example for the hardware abstraction layer. As described above, each emulated machine includes a guest operating system in which at least one application runs.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. In a computer system having a virtualization software on which a virtual machine is run, the virtualization software supporting execution of the virtual machine in which a container is run, the virtual machine comprising a guest operating system on which the container executes, the container comprising one or more applications deployed therein, a method of provisioning a data volume for the container, comprising:
   monitoring, by the virtualization software, a designated virtual socket of the virtual machine, wherein the virtual socket enables the virtual machine to communicate with the virtualization software;
   based on said monitoring, detecting, by a component running within the virtualization software, a request from a plug-in of the container to create a data volume, the data volume backed by a storage device, the plug-in providing an interface between the container and the virtualization software, wherein the virtualization software is configured to provide an interface between the plug-in and the storage device; and
   upon detecting the request, communicating, by the component, the request to the virtualization software to cause the virtualization software to create the data volume.

2. The method of claim 1, wherein the designated virtual socket is accessed through a privileged port of an inter-process communication interface.

3. The method of claim 2, wherein the plug-in executes in root mode and communicates the request through the privileged port of the inter-process communication interface.

4. The method of claim 1, further comprising:
   upon detecting the request and after communicating the request to the virtualization software to cause the virtualization software to create the data volume, communicating a request to the virtualization software to attach the data volume to the virtual machine;
   after the data volume is attached to the virtual machine, formatting the data volume with a file system; and
   after formatting the data volume with the file system, communicating a request to the virtualization software to detach the data volume from the virtual machine.

5. The method of claim 4, wherein the virtualization software attaches the data volume to the virtual machine by adding an identifier of the data volume to a configuration file of the virtual machine and detaches the data volume from the virtual machine by removing the identifier of the data volume from the configuration file of the virtual machine.

6. The method of claim 1, further comprising:
   based on said monitoring, detecting a request from the plug-in of the container to map a data volume to a namespace used by the container;
   upon detecting the request to map, determining if the data volume has been created;
   if the data volume has been created, mounting a file system for the data volume into the namespace used by the container so as to map the data volume to a folder accessible by the container; and
   if the data volume has not been created, returning an error.

7. The method of claim 6, wherein the data volume that the plug-in of the container is requesting to map is the same data volume that the plug-in of the container requested to create.

8. The method of claim 6, wherein the data volume that the plug-in of the container is requesting to map is different from the data volume that the plug-in of the container requested to create.

9. The method of claim 8, wherein the data volume that the plug-in of the container is requesting to map is a data volume that a plug-in of a different container requested to create.

10. A non-transitory computer readable medium comprising instructions to be executed in a computer system having a virtualization software on which a virtual machine is run, the virtualization software supporting execution of the virtual machine in which a container is run, the virtual machine comprising a guest operating system on which the container executes, the container comprising one or more applications deployed therein, wherein the instructions when executed cause the computer system to carry out a method of provisioning a data volume for the container, said method comprising:
   monitoring, by the virtualization software, a designated virtual socket of the virtual machine, wherein the virtual socket enables the virtual machine to communicate with the virtualization software;
   based on said monitoring, detecting, by a component running within the virtualization software, a request from a plug-in of the container to create a data volume, the data volume backed by a storage device, the plug-in providing an interface between the container and the virtualization software, wherein the virtualization software is configured to provide an interface between the plug-in and the storage device; and
   upon detecting the request, communicating, by the component, the request to the virtualization software to cause the virtualization software to create the data volume.

11. The non-transitory computer readable medium of claim 10, wherein the designated virtual socket is accessed through a privileged port of an inter-process communication interface.

12. The non-transitory computer readable medium of claim 11, wherein the plug-in executes in root mode and communicates the request through the privileged port of the inter-process communication interface.

13. The non-transitory computer readable medium of claim 10, wherein the method further comprises:
   upon detecting the request and after communicating the request to the virtualization software to cause the virtualization software to create the data volume, communicating a request to the virtualization software to attach the data volume to the virtual machine;
   after the data volume is attached to the virtual machine, formatting the data volume with a file system; and
   after formatting the data volume with the file system, communicating a request to the virtualization software to detach the data volume from the virtual machine.

14. The non-transitory computer readable medium of claim 13, wherein the virtualization software attaches the data volume to the virtual machine by adding an identifier of the data volume to a configuration file of the virtual machine and detaches the data volume from the virtual machine by removing the identifier of the data volume from the configuration file of the virtual machine.

15. The non-transitory computer readable medium of claim 10, wherein the method further comprises:
   based on said monitoring, detecting a request from the plug-in of the container to map a data volume to a namespace used by the container;

upon detecting the request to map, determining if the data volume has been created;

if the data volume has been created, mounting a file system for the data volume into the namespace used by the container so as to map the data volume to a folder accessible by the container; and if the data volume has not been created, returning an error.

16. The non-transitory computer readable medium of claim 15, wherein the data volume that the plug-in of the container is requesting to map is the same data volume that the plug-in of the container requested to create.

17. The non-transitory computer readable medium of claim 15, wherein the data volume that the plug-in of the container is requesting to map is different from the data volume that the plug-in of the container requested to create.

18. The non-transitory computer readable medium of claim 17, wherein the data volume that the plug-in of the container is requesting to map is a data volume that a plug-in of a different container requested to create.

19. A computer system having a first host computer system including a first virtualization software on which a first virtual machine is run, the virtualization software supporting execution of the first virtual machine in which a first container is run, and a second host computer system including a second virtualization software supporting execution of a second virtual machine in which a second container is run, the first virtual machine comprising a guest operating system on which the first container executes, the first container comprising one or more applications deployed therein, wherein the first virtualization software has a first background process running therein to perform the steps of:

monitoring, by the virtualization software, a first designated virtual socket of the first virtual machine, wherein the first designated virtual socket enables the first virtual machine to communicate with the first virtualization software;

based on the monitoring of the first designated virtual socket, detecting a request from a plug-in of the first container to create a data volume, the data volume backed by a storage device, the plug-in providing an interface between the container and the virtualization software, wherein the virtualization software is configured to provide an interface between the plug-in and the storage device; and upon detecting the request, communicating the request to the first virtualization software to cause the first virtualization software to create the data volume.

20. The computer system of claim 19, wherein the second virtualization software has a second background process running therein to perform the steps of:

monitoring a second designated virtual socket;

based on the monitoring of the second designated virtual socket, detecting a request from a plug-in of the second container to map the data volume to a namespace used by the second container;

upon detecting the request to map, determining if the data volume has been created;

if the data volume has been created, mounting a file system for the data volume into the namespace used by the second container so as to map the data volume to a folder accessible by the second container; and if the data volume has not been created, returning an error.

* * * * *